United States Patent [19]

Groth

[11] 4,029,258
[45] June 14, 1977

[54] SOLAR ENERGY COLLECTOR

[75] Inventor: Glenn F. Groth, Sheboygan, Wis.

[73] Assignee: Sun Unlimited Research Corporation, Sheboygan, Wis.

[22] Filed: Nov. 14, 1975

[21] Appl. No.: 631,938

[52] U.S. Cl. .............................. 237/1 A; 126/270; 236/91 A
[51] Int. Cl.² .......................................... F24D 0/00
[58] Field of Search ........... 237/1 A; 126/270, 271; 236/91 A

[56] References Cited

UNITED STATES PATENTS

| 2,680,565 | 6/1954 | Lof | 126/271 |
| 3,902,474 | 9/1975 | Pyle | 237/1 A |
| 3,931,806 | 1/1976 | Hayes | 126/271 |
| 3,946,721 | 3/1976 | Keys et al. | 126/270 |

*Primary Examiner*—William E. Wayner
*Assistant Examiner*—R. J. Charvat
*Attorney, Agent, or Firm*—Andrus, Sceales, Starke & Sawall

[57] ABSTRACT

A metal collector plate with black paint on its face is mounted in a heat insulated space with a dual pane transparent member transmitting solar rays to the face of the plate. The front face of the plate is spaced from the transparent member providing a passage for free flow of air upwardly along the painted surface. The back side of the plate is divided transversely for exposure to two air chambers, the lower air chamber receiving incoming cool air which becomes pre-heated by contact with the back side and then flows through suitable passages through the lower edge of the plate into the free flow passage, and the upper air chamber receiving heated air from the free flow passage through slots at the upper edge of the plate and additionally providing for contact between the heated air and the back side of the plate. A differential thermostat control for flow of air through the collector unit is operated by heat sensor probes in the cold air intake and hot air chamber.

10 Claims, 3 Drawing Figures

SOLAR ENERGY COLLECTOR

BACKGROUND OF THE INVENTION

This invention relates to a solar energy collector utilizing air or other fluid as the heat transfer media.

The initial cost and the efficiency of such collectors have been the major problems encountered in constructing a practical collector.

Collector units have been proposed employing flat plates disposed to face the sun and over which air flows in contact with the plates to pick up heat therefrom and transmit the same to a storage unit or to a point of use.

Furthermore, it has been known to apply a black paint to a flat-plate collector to provide a highly efficient selective surface giving good absorptance of solar energy.

In systems utilizing air as the heat pick-up media, there is a need for considering the optimum air velocity for turbulent air flow in contact with the surface of the heated flat-plate collector, and controlling the air flow in accordance with the available heat. In general the higher the temperature of the flat plate collector the higher air velocity may be employed for a given output air temperature, and/or the higher will be the output air temperature for a given velocity of air.

Since the sun does not always shine constantly upon the collector, there may be frequent times in which the temperature of the flat-plate collector drops because of lack of solar energy input.

SUMMARY OF THE INVENTION

The solar energy collector of the present invention is constructed in modules generally disposed side by side and facing the sun at a collector tilt determined by the climatic conditions of the particular location.

Each module constitutes a heat insulated enclosure presenting a predetermined generally flat face of maximum area tilt toward the sun and which has a dual pane glass front for transmitting solar energy to the flat-plate collector within.

The flat-plate collector is of sheet metal such as aluminum mounted by its edges within the enclosure and spaced from the glass front to divide the enclosure into a front air flow channel and a space in back of the flat-plate.

The back space is partitioned midway across the same to provide support for the relatively thin flat plate in the enclosure.

The lower part of the back space constitutes an inlet chamber for air to directly contact the back of the flat-plate collector, and is in communication with the front air flow channel by a transverse slot or other opening along the lower edge portion of the flat-plate collector.

The upper part of the back space constitutes an outlet chamber for heated air passing into it through a transverse slot or other opening along the upper edge of the flat-plate collector from the front air flow channel. The heated air in the outlet chamber directly contacts the back side of the flat-plate collector to additionally remove solar energy therefrom.

The circulation of air through the collector is effected by a fan in a supply duct leading to the inlet chamber.

A differential thermostat is employed to prevent actuation of the fan motor whenever a difference in temperature of less than 7° F. is present between the temperature of the air in the supply duct and either the air in the outlet chamber or the flat-plate collector in a region near the upper edge of the latter. The same differential thermostat additionally closes the supply duct and the discharge duct unless the temperature differential previously referred to does not exceed 7° F.

BRIEF DESCRIPTION OF THE DRAWING

The accompanying drawing illustrates the best mode presently contemplated of carrying out the invention.

DESCRIPTION OF THE PREFERRED EMBODIMENT

Figure 1:
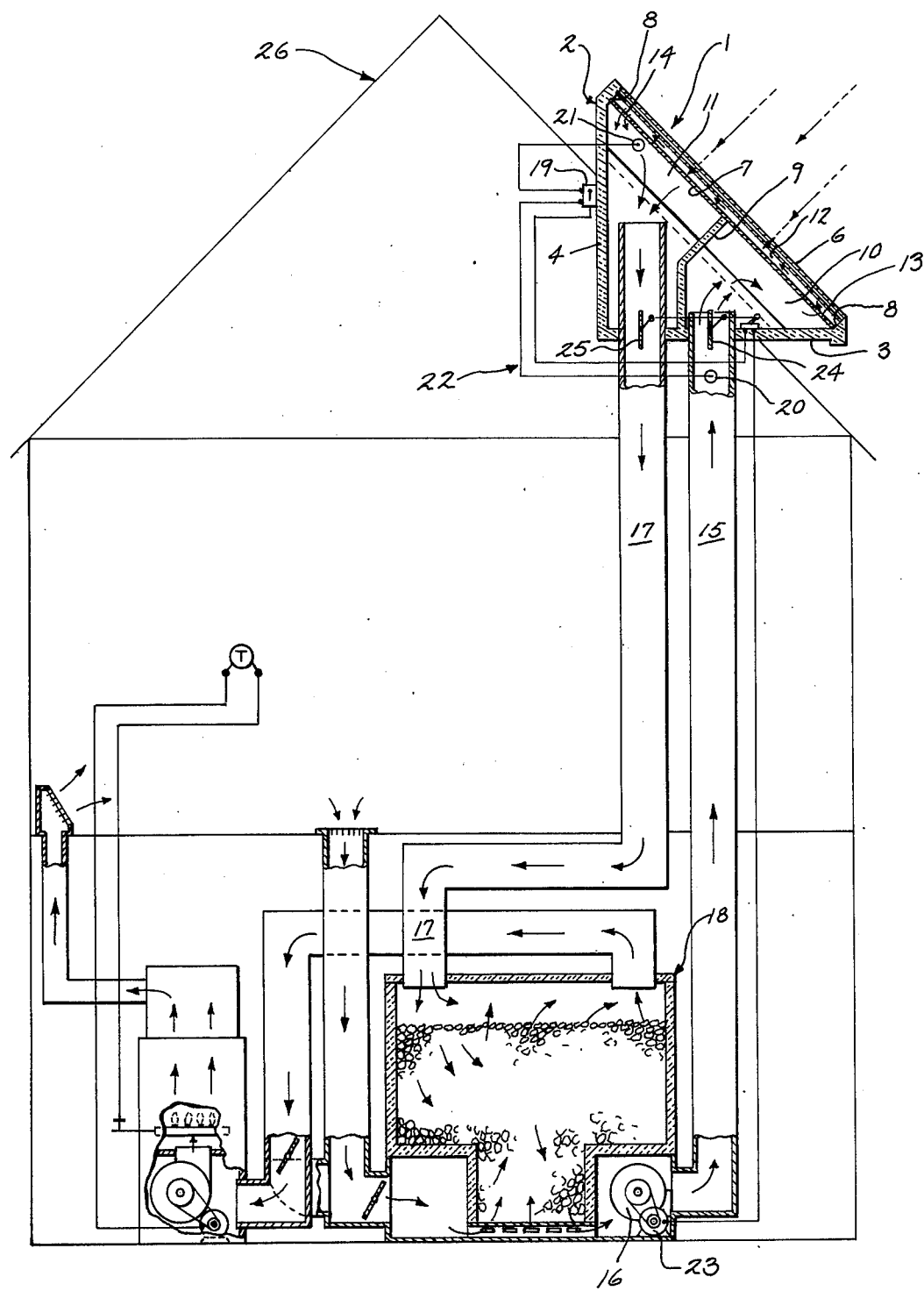
FIG. 1 is a vertical schematic view of a collector unit and air flow system.
Figure 2:
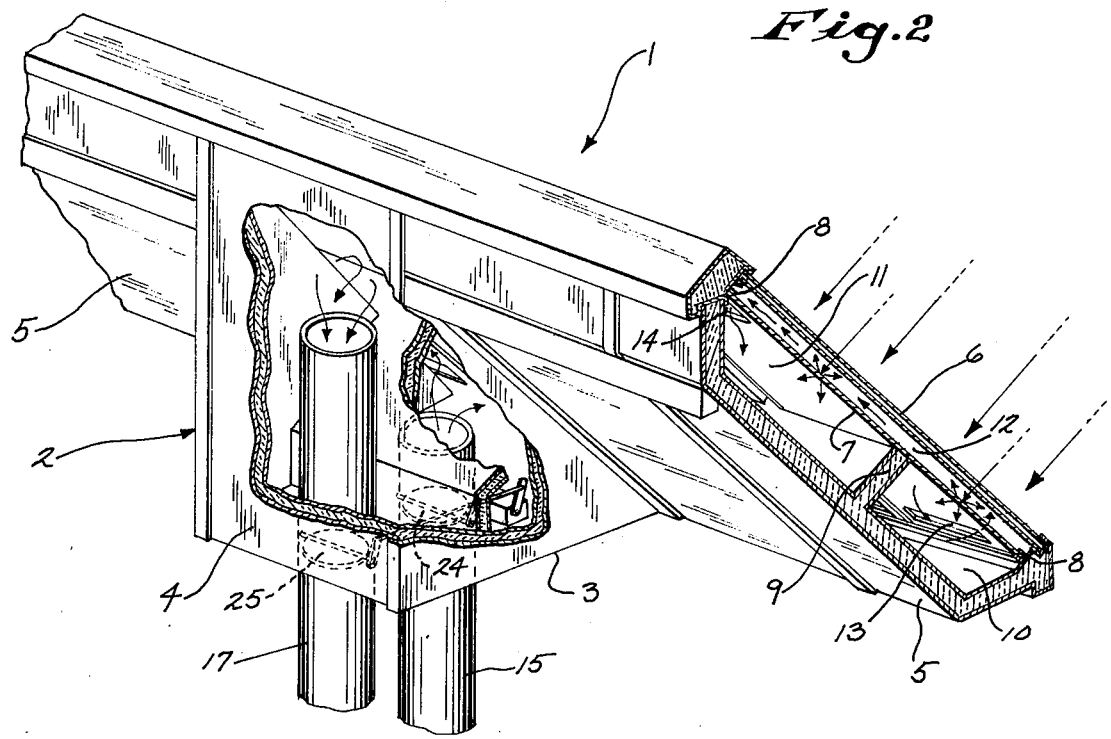
FIG. 2 is a perspective view of the collector of FIG. 1.
Figure 3:
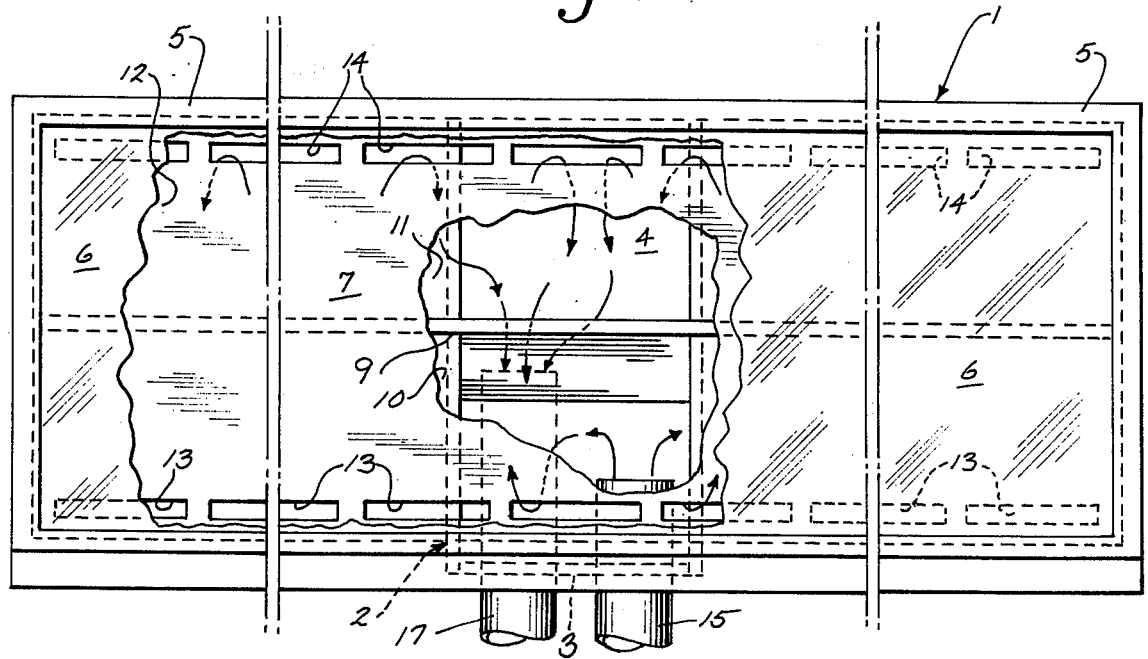
FIG. 3 is a front face view of the collector of FIG. 1 with parts broken away to show the construction.

The module of the solar energy collector as illustrated in the drawings, comprises a collector unit having an enclosure or housing 1 with a generally triangularly shaped body portion 2 and with a horizontal bottom 3, and vertical back side 4.

The body portion 2 of housing 1 merges on either side with the wing portions 5 which extend in a tilted plane across the front of the body portion.

The front of the housing 1 is tilted to a position reasonably normal to the rays of the sun at a prime time of day.

The body portion 2 and wing portions 5 are constructed of heat insulating material such as and the front is closed by one or more panels of dual pane glass 6 set in a removable frame sealed to the body portion against weather leakage.

A flat-plate collector 7 is spaced from and preferably parallel to the glass 6 and is supported at its edges by suitable flanges or shoulders 8 in the walls of the housing.

The flat-plate collector 7 may be of any available material having the ability to become heated by the rays of the sun. That currently employed constitutes a thin sheet of aluminum, copper or other metal preferably painted black with a composition of high absorptance of solar energy.

The space in housing 1 behind the flat-plate collector 7 is divided by a transverse partition 9 into an inlet chamber 10 and an outlet chamber 11.

The partition 9 extends from the bottom of the housing 1 to the center of the flat-plate collector 7 supports the latter centrally against undue sagging.

The inlet chamber 10 is generally beneath and toward the front from the partition 9.

Chamber 10 is in communication with the space 12 between flat-plate collector 7 and glass 6 by means of a series of slots 13 or other openings through the collector plate 7 along the lower edge portion of the plate.

The outlet chamber 11 is generally behind the above the partition 9 and is in communication with space 12 by means of a series of slots 14 or other openings through the collector plate 7 along the upper edge portion of the plate.

Air is supplied to inlet chamber 10 through a pipe or duct 15 by means of a fan 16 providing forced flow of air through the collector.

Air is exhausted from outlet chamber 11 through a pipe or duct 17 to a storage unit 18 or to equipment utilizing the heat from the air.

The air circuit as illustrated provides a continuous flow of air through pipe or duct 15, inlet chamber 10, slots 13, space 12, slots 14, outlet chamber 11, pipe or duct 17 and storage unit 18 back to duct 15. The fan 16 is preferably located between the storage unit 18 and cold air duct 15.

Control of the flow of air through the circuit provides a shut off for the fan 16 during periods when the solar energy reaching the flat-plate collector is below a predetermined minimum amount.

For this purpose a differential thermostat 19 is operated by two temperature sensing probes, probe 20 in duct 15 and probe 21 in outlet chamber 11 preferably attached to the back of the flat collector plate 7.

The thermostat 19 opens and closes the energizing circuit 22 for the motor 23 driving fan 16.

A suitable differential temperature between probes 20 and 21 for actuating the thermostat is of the order of 7° F.

In other words, when sensing probe 21 is at least 7° F. warmer than sensing probe 20 the thermostat 19 closes the motor circuit 22 to energize the motor 23 and drive fan 16, and when the sensing probe 21 is not at least 7° F. warmer than sensing probe 20 the thermostat 19 will maintain circuit 22 open and motor 23 will not drive fan 16.

The heat storage unit 18 may be of the rock type, or it may be any heat exchange apparatus for transferring the heat into storage material or into useful form.

In order to prevent loss of heat from unit 18 as by air convection when the fan 16 is not operating, it is desirable to provide a damper 24 in duct 15 and a damper 25 in duct 17 actuated by suitable damper motors under the control of thermostat 19 to close the ducts when fan 16 is not operating and to open the ducts when fan 16 is operating.

The dampers 24 and 25 are particularly needed where the collector unit is placed on the roof of a building 26 as illustrated in FIG. 1, and the heat storage or heat exchange unit 18 is located in the basement of the building.

The housing 1 of the collector unit is constructed to provide for its location either on a slanting roof, as shown, on a flat roof, on a vertical wall, or on an angular support providing the required exposure of the flat collector plates 7 to the rays of the sun.

Various modes of carrying out the invention are contemplated as being within the scope of the following claims particularly pointing out and distinctly claiming the subject matter which is regarded as the invention.

I claim:

1. A solar energy collector system comprising a flat-plate collector unit having an air inlet and an air outlet, means for removing heat from air, and means to circulate air from said heat removal means to said collector inlet and from said collector outlet to said heat removal means; said collector unit comprising a heat insulated housing having a transparent face exposed to the rays of the sun, a flat-plate collector spaced from said transparent face in said housing and extending to the sidewalls of said housing, a partition in said housing supporting the back of said flat-plate collector and dividing the portion of said housing behind the flat-plate collector into separate inlet and outlet chambers connected respectively to said air inlet and air outlet, and passage means for the flow of air from said inlet chamber into and upwardly through the space between said transparent face and said flat-plate collector to said outlet chamber, a substantial part of the back side of said collector plate being exposed directly to the air in said chambers.

2. The construction according to claim 1 in which said flat-plate collector is sealed against the walls of said housing, and said passage means comprises openings near the bottom and top edges of said flat-plate collector.

3. The construction according to claim 1 and a differential thermostat control sensing the supply of heat energy received by said flat-plate collector for controlling said air circulating means.

4. The construction according to claim 3 in which said differential thermostat is controlled by a heat sensing probe in the air inlet for said collector unit, and a heat sensing probe responsive to heat from said flat-plate collector.

5. The construction according to claim 4 in which said air circulating means comprises a motor driven fan responsive to said differential thermostat whereby a predetermined temperature differential between said heat sensing probes actuates the thermostat to energize said motor and drive said fan.

6. The construction according to claim 3 in which said collector unit is disposed above said heat removal means, said air circulating means comprises separate ducts between said heat removal means and said inlet and outlet for said collector unit, and damper means in said ducts operatively controlled by said differential thermostat.

7. The construction according to claim 6 in which said differential thermostat is controlled by a heat sensing probe in said air inlet for said collector unit and a heat sensing probe responsive to heat from said flat-plate collector.

8. The construction according to claim 7 in which said air circulating means comprises a motor driven fan responsive to said differential thermostat.

9. The construction according to claim 8 in which said differential thermostat is controlled by a heat sensing probe in the air inlet and a heat sensing probe responsive to heat from said flat-plate collector, whereby a predetermined temperature differential between said heat sensing probes actuates the thermostat to energize said motor for driving said fan and also to open said damper means in said air ducts.

10. The construction of claim 2 in which said partition extends generally transversely of the back side of the collector plate so that the air in the inlet chamber is in direct contact with the lower portion of the back side of said plate and the air in the outlet chamber is in direct contact with the upper portion of the back side of said plate.

* * * * *